United States Patent

[11] 3,562,413

[72] Inventor Charles H. Coleman
Belmont, Calif.
[21] Appl. No. 882,353
[22] Filed Dec. 15, 1969
Continuation of application Ser. No. 640,187, May 22, 1967, now abandoned.
[45] Patented Feb. 9, 1971
[73] Assignee Ampex Corporation
Redwood City, Calif.
a corporation of California

[54] SWITCHING SEQUENCE DETECTOR FOR P.A.L. COLOR TELEVISION
6 Claims, 3 Drawing Figs.

[52] U.S. Cl. .......... 178/5.4, 178/69.5
[51] Int. Cl. .......... H04n 9/46
[50] Field of Search .......... 178/5.4CR, 5.2, 5.4, 5.4 FOR, 5.4 SYNC, 69.5CB, 69.5TV

[56] References Cited

UNITED STATES PATENTS

| | | | |
|---|---|---|---|
| 3,474,190 | 10/1969 | Bruch | 178/5.4 |
| 3,492,417 | 1/1970 | Schole | 178/5.4 |

*Primary Examiner*—Robert L. Griffin
*Assistant Examiner*—John C. Martin
*Attorney*—Robert G. Clay

ABSTRACT: A time-base correcting system primarily adapted for use in video tape recording equipment and providing synchronous lockup and time base corrected operation of the video-tape recorder in the playback mode. The system includes circuitry receiving phase alternating line (PAL) composite television signals and which determines the burst switching sequence of the recorded signal before stable lockup is achieved.

Figure 1:
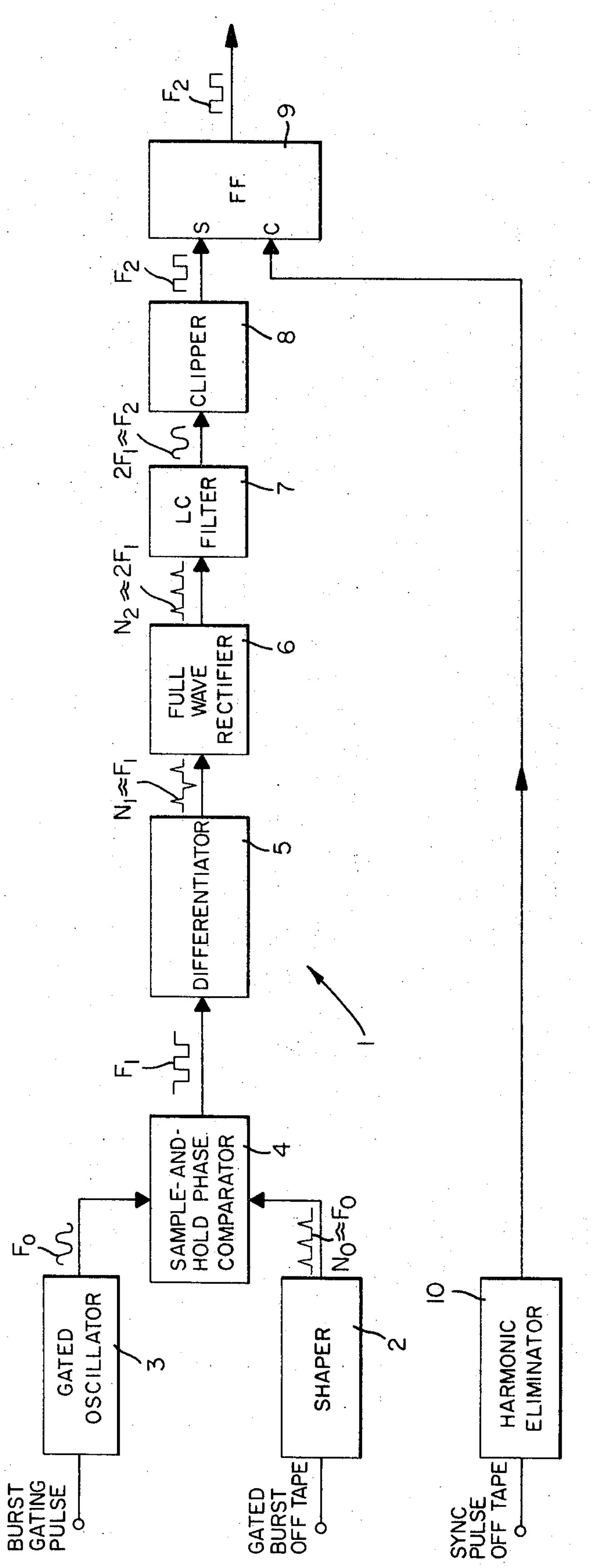

INVENTOR.
CHARLES H. COLEMAN, JR
BY Thomas E. Schatzel
ATTORNEY

INVENTOR.
CHARLES H. COLEMAN, JR.
BY Thomas E. Schatzel
ATTORNEY

INVENTOR.
CHARLES H. COLEMAN, JR.

BY [signature]

ATTORNEY

SWITCHING SEQUENCE DETECTOR FOR P.A.L. COLOR TELEVISION

This is a continuation of application Ser. No. 640,187 filed May 22, 1967 and now abandoned.

The present invention relates to systems for processing color television signals and more particularly to systems for identifying the sequence of alternation of the color burst phase of a phase alternating line color television signal.

Color television systems for broadcasting consist for the most part of three systems: NTSC (National Television Systems Committee); PAL (Phase Alternating Line); and SECAM (Sequential and Memory). The NTSC system which is incorporated in the United States centers about the simultaneous transmission of all brightness (luminance) and color (chrominance) information and operates on 525 lines per frame with a 3.58-MHz. subcarrier frequency. The SECAM system, developed by the French, transmits all the luminance and only alternating components of chrominance information on every other television line. The PAL system now adopted by most Western European countries incorporates a technique by which every alternate television line has the phase of the R-Y chrominance information and the burst keying signal switched by 180°. Both PAL and SECAM operate on 625 lines per frame with a 4.43 -MHz. subcarrier frequency.

In reproducing color signals it is essential that the video signals be maintained in true phase with the actual time base. Otherwise, a loss of time base stability with resulting phase shift results in shifting of chrominance and luminance components and resultant loss in the fidelity of the color picture. In transverse scan rotary head recorders, the servo control must position the tape horizontally and control the angular velocity of the video heads to establish the head-tracking relationship that existed during recording. A novel system providing high order time base stability for reproducing NTSC signals is disclosed in U.S. Pat. No. 3,100,816 entitled "Timing Control for Signal Reproducing Systems," granted to C.H. Coleman, Jr. and P.W. Jensen and assigned to the assignee of the present invention. As will be hereinafter described, the present invention may be incorporated with this patented system to accommodate PAL signals.

The existence of three distinct color systems makes it desirable to provide tape recording equipment compatible with all systems and to derive means for adapting existing recorders to accommodate the three systems. The sections of present NTSC recorders which have required investigation to accommodate the PAL and SECAM signals are the servosystem, the video processing amplifier, and especially the time-base correcting system. Principal variations from NTSC to be considered are the basic four-field per frame with the fields at a rate of 50 per second and a resultant 12.5 Hz. frame pulse rate, the use of a phase alternated color burst of 4.43 MHz., the staggered vertical burst blanking, and operational problems which occur when color and monochrome signals are intermixed or interspliced for sequential playback via magnetic tape.

Both PAL and SECAM systems differ from the NTSC system in the number of fields over which the color coding sequence takes place. In the NTSC system coding occurs over two fields, whereas the PAL and SECAM systems require four fields to complete the coding. Strictly speaking, four fields are required in the NTSC system before a field repeats exactly, eight fields are required in PAL, and twelve fields are required in SECAM. However, since a video recorder is only concerned with the coding sequence, only the two-field sequence for NTSC and four-field sequence for PAL and SECAM are of primary concern.

In the video recording process a pulse, known both as frame pulse or credit pulse, is superimposed on the control track signal. The pulse may be used for dual purposes—the program material of a tape or directing the recorder servo system when operating in the fully synchronous playback mode. In the various systems, the edit or frame pulses are laid down in distinct sequences which are not compatible. In PAL, there is a four-field edit or frame pulse of 12.5 Hz. In the NTSC color system, the edit pulse occurs during the vertical synchronizing pulse which follows the field ending with a full horizontal line. A further factor of concern with the edit or frame pulses is that reproduction depends on the quality of which the pulses were originally laid down. Also, the pulses may have been inadvertently extinguished.

The need for the edit or frame pulses for tape editing purposes is obvious and mandatory. However, for fully synchronous lockup of the video tape recorder in the playback mode, the present invention provides a network not requiring recorded pulses. The pulses are generated within the reproducing circuit network and switching sequence detector circuitry determines the burst switching sequence of the recovered recorded sin signal before stable lockup is achieved. The necessary information for generating the correctly timed pulses is derived by comparing horizontal and vertical rate information and the burst switching information. For the PAL system, since there are 625 lines per frame, 25 frames per second and the burst keying signal is switched 180° on alternate lines, the switching information occurs at a rate of 7.8 kHz. In the recording process, the 7.8 kHz. signal is derived from the input video signal as are the horizontal and vertical sync rate signals.

Various advantages are realized from the present invention including that the presence or absence of edit pulses is immaterial; lockup time is not appreciably increased over the monochrome case; and color signals may be recorded on any high-band recorder even if it has not been modified to produce edit pulses. Other benefits in deriving the switching sequence from the recovered signal rather than a reference signal are that if fully synchronous operation is not mandatory, but servo operation in the horizontal lock mode is desirable, it provides fast initial lockup and fast recovery from any servo upset. The servo simply locks up on the nearest horizontal line.

SUMMARY OF THE INVENTION

The circuit network of the present invention, for illustrative purposes, will be described as it has been adapted for use in video tape recorders type t signal reproducing system receiving PAL signals. The gated color burst is extracted from the tape composite signal and applied to a signal shaping circuit which provides a train of unidirectional pulses—one per cycle of the burst subcarrier frequency. Simultaneously a burst-gating pulse (time related to sync) is received by an oscillator generating a responsive sine wave signal coinciding with the burst subcarrier frequency. The outputs of the shaper and the oscillator are received by a phase comparator providing a burst representative output signal having a frequency dependent upon the phase angle between the gated burst and the oscillator signal. The comparator output is generally in the form of a square wave, which in the case of a PAL signal consequently shifts between two levels every other horizontal line of the signal, hence, at a frequency of one-fourth the line frequency. For the illustrated PAL embodiment the comparator frequency is 3.9 kHz. which is one-half the standard 7.8 kHz. rate of color burst phase switching and one-fourth of the 15.6 kHz. line frequency. The comparator output frequency is then doubled to produce a burst-switching sequence signal of the desired frequency rate. As illustrated, frequency doubling may be realized by passing the comparator output through a differentiator to form a train of bidirectional pulses, then a rectifier to form a train of unidirectional pulses of a rate coinciding with the burst phase switching rate. The unidirectional pulses are converted to substantially a square wave which square wave sets the phase of a flip-flop. The flip-flop is cleared by a train of horizontal sync pulses originating from the tape. The use of a flip-flop in this manner provides assurance of locking phase with the sync pulses and thus provides a square wave output for switching information that is fully synchronous with reference horizontal sync and with the reference color bursts.

Figure 2:
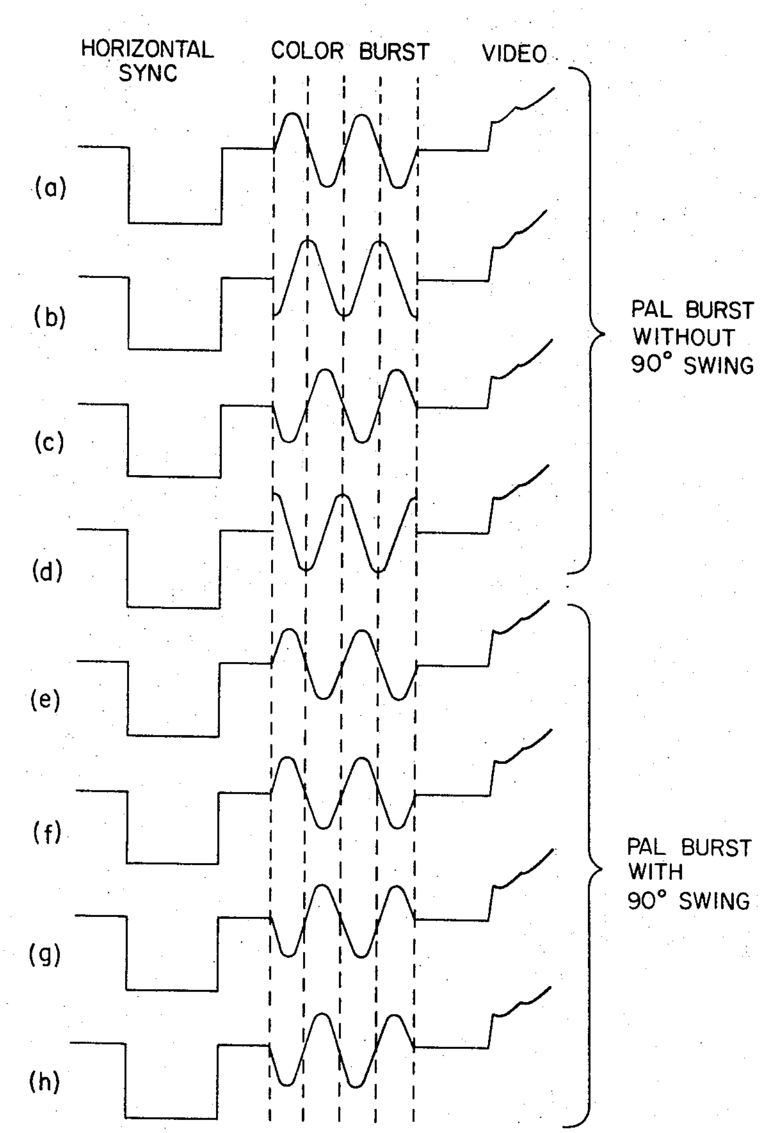
Figure 3:
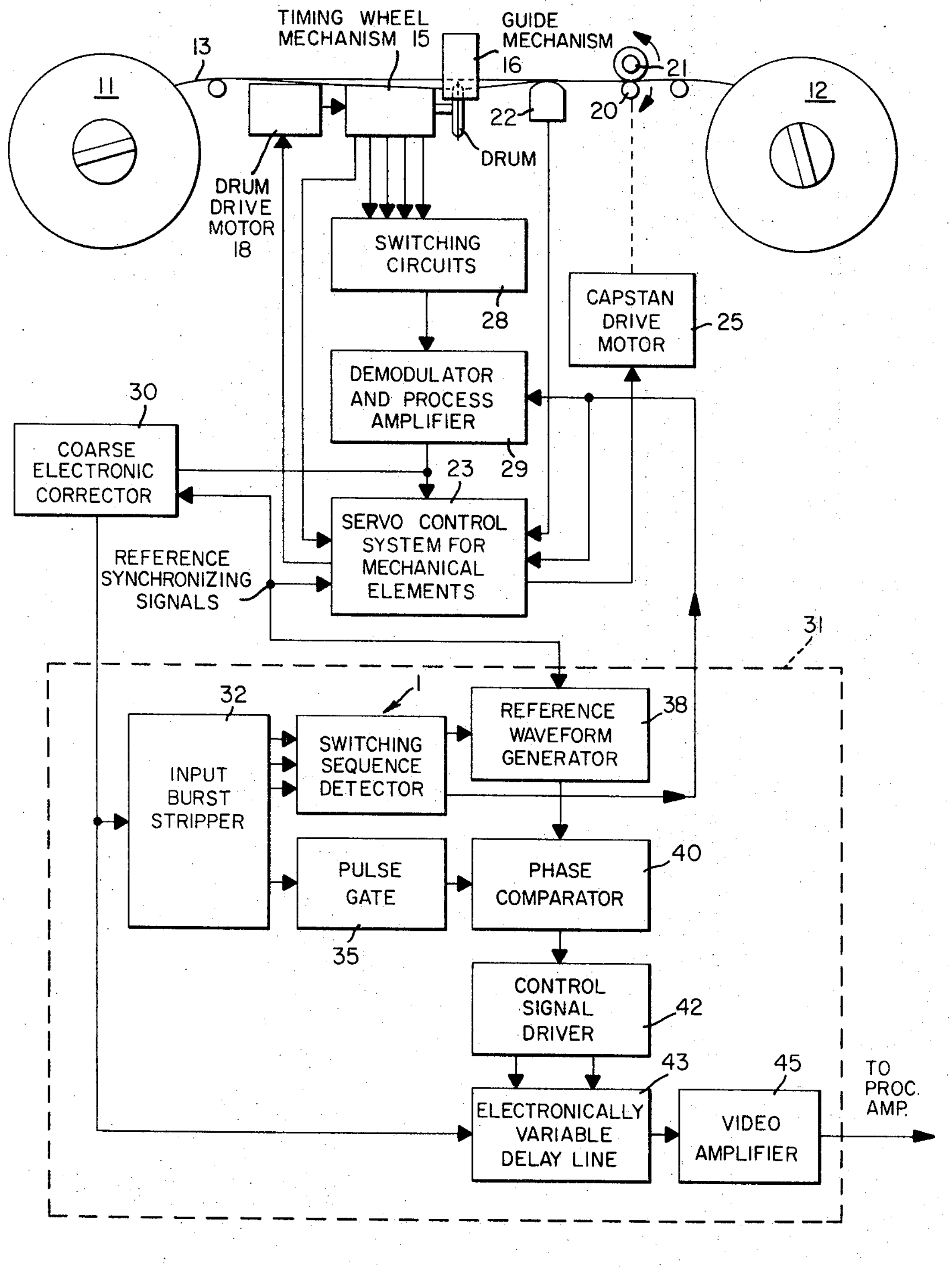

To further illustrate the nature of the present invention reference may be made to the drawings in which:

FIG. 1 illustrates in block diagram form a burst-switching sequence detector of the present invention as adapted for use in PAL signal system; FIG. 2 includes a plurality of waveforms illustrating the operation of the phase comparator of the network of FIG. 1; and FIG. 3 illustrates a magnetic tape reproducing system incorporating the switching sequence detector of the present invention.

PREFERRED EMBODIMENT

Viewing FIG. 1 the switching sequence detector circuit network is referred to by the general reference character 1. A gated color burst having a subcarrier frequency $F_o$ and originating from a color television signal source, for example, magnetic tape television recording, is received by a shaper or limiter circuit 2. The shaper 2 provides means for extracting the color burst from each line of a television signal. The output of the shaper 2 is a train of unidirectional pulses having a rate $N_0$ coinciding with the subcarrier frequency $F_0$. Since PAL signals have a subcarrier frequency of 4.43 MHz., $N_o$ coincides at $4.43\times 10^6$ p.p.s.

A burst-gating pulse, which is horizontal synctime related, is used to start a 4.43 MHz. gated oscillator 3, which provides a reference signal in predetermined time relation to the horizontal sync pulse of each line. The oscillator output and the train of pulses are received by a sample-and-hold phase comparator 4. The phase of the output of the oscillator 3 is constant with respect to the horizontal sync whereas the phase of the PAL gated bursts reverses every other line. The output of the comparator 4 is a burst phase representative signal whose value is a function of the phase angle difference between the oscillator 3 signal and the pulses from the shaper 2.

The output of the phase comparator 4 is in the form of a square wave operating at a frequency $F_l$. When $F_o$ equals 4.43 MHz., $F_1$ equals 3.9 kHz. or one-fourth the line frequency and one-half the color burst phase switching rate of the television signal. Each edge of the square wave indicates the time when the burst is swinging from the counter-NTSC phase (225°) to the NTSC phase (135°). To more fully explain why a 3.9 kHz. square wave is obtained, consider FIG. 2 and the status of a PAL burst over four lines. For clarity disregard the 25 Hz. offset and consider the burst as it would be if it were not alternated 90° each line. Because the subcarrier frequency is 283¾ times that of the horizontal scanning frequency, (4.43 MHz. : 15.6 KAz.) the burst will drop behind 90° each line, as illustrated by the drawing of FIG. 2 (*a*)—2(*d*). FIGS. 2(*e*)—2 (*h*) illustrate the behavior of the burst with the 90° alternation added. In line 2 (FIG. 2 (*f*) ) the advance of burst from 135° to 225° cancels the 90° lag. When the burst swings back to the 135-° phase position one line later (FIG. 2 (*g*) ), the effect is a 180-° phase shift of line 3. This phase is also held for line 4 (FIG. 2(*h*) ). Thus, there is an 180-° jump in phase each time the burst alternates from 225° to 135-° position. The addition of the 25 Hz. offset simply causes an amplitude modulation of the 3.9 kHz. square wave.

To obtain the 7.8 kHz. signal indicative of color burst phase switching rate there are provided means for doubling the frequency $F_1$, including a differentiator 5, which forms a train of bidirectional pulses with the pulses in each direction of rate $N_1$. The bidirectional pulses are then received by a full-wave rectifier 6 to form a train of unidirectional pulses of rate $N_2$ equal to $7.8\times 10^3$ p.p.s. The pulses of rate $N_2$ are then received by conversion means for converting the pulses to a continuous waveform of frequency $F_2$. As illustrated, the conversion means includes an inductance-capacitance filter network 7 generating a sine wave at the desired frequency $F_2$ of 7.8 kHz. The sine wave is then recieved by a clipper circuit 8 such that the signal takes the substantial form of a square wave of the frequency $F_2$. The square wave signal is then used to set the phase of a flip-flop switching circuit 9. The clear input terminal C of the flip-flop 9 extends to a harmonic eliminator 10 which receives 15.625 kHz. horizontal sync pulses and 31.5 kHz. equalizing pulses from the source of color television signals. The eliminator eliminates the equalizing pulses. Though flip-flop 9, as included, is not essential for acquiring a synchronized signal locked to a horizontal sync signal, it does provide assurance that the negative edges of the sync signal and the negative edges of the 7.8 kHz. square wave signal are in coincidence, and locked up. Accordingly, the 7.8 kHz. square wave from the flip-flop 9 is, for example, ready for transmission to the processing amplifier in the servocontrol system for precise control and correction of the head and the capstan operations of a magnetic tape reproducing system.

FIG. 3 illustrates the switching sequence detector of the present invention as it is incorporated in a magnetic tape type signal reproducing system to accommodate NTSC and PAL signals. For a detailed discussion of the network as it is adopted for standard NTSC signals, refer to the previously cited U.S. Pat. No. 3,100,816. The system includes a supply reel 11 and a takeup reel 12 between which a tape 13 is fed past an operative zone. Within the operative zone, signal reproduction is effected by a head drum engaging the tape and a time wheel mechanism 15. The width of the tape 13 is guided or cupped by a guide 16 to conform to the circumference of the head drum. A drum drive motor 18 rotates the head drum and timing wheel mechanism 15 at a controlled rate. A drive capstan 20, when engaged with a pinch roller 21 drives the tape longitudinally past the operative zone.

A magnetic pickup head 22 is positioned along the edge of the tape 13 to pickup previously recorded timing signals for speed control of the capstan 20 during playback. Also, timing information from the timing mechanism 15 is received directly by a servocontrol system 23 for controlling the angular speed and phase of the rotary head drum. The servocontrol system 23 governs the speed of the drum drive motor 18 and a capstan drive motor 25.

Multiple heads are mounted on the drum and used in the illustrated transverse track recording and reproducing system. The heads are spaced such that at least one head is reproducing information at any given time. The signals from the different heads are fed to a switching network 28 including a plurality of switching circuits. The switching circuits operate synchronously with the head drum to recombine the signals into a single channel and reconstitute the composite television signal. Thereafter, the television signals are passed through demodulator and processing amplifier circuitry 29 which reforms the original signal.

To effect color phase correction of great accuracy and stability, the composite signal is passed through a coarse correction circuit 30 and a fine correction circuit illustrated within the block diagram 31. The fine correction circuit 31 as adapted for NTSC operation includes an input burst stripper circuit 32 which receives the signal from the coarse corrector 30 and extracts the horizontal sync pulse contained in the composite color television signal. The horizontal synchronizing pulse is followed by the color burst. The horizontal sync pulse is then used with the burst stripper 32 as a timing reference for gating the subsequent color burst. The burst stripper 32 passes the color burst to a color burst gate 35, which selects particular parts of the waves of the color burst as samples of the actual phase of the color burst. Concurrently, a reference waveform generator 38 which is also tied to a reference synchronizing source of the subcarrier frequency provides a waveform in phase with the reference frequency of 3.58 MHz. coinciding with the subcarrier frequency of the NTSC signals. A time comparison is then made between pulses passed by the pulse gate 35 and the reference signal in a phase comparator 40.

The phase comparator 40 develops an error signal which is processed by a control signal driver 42 to generate suitable control voltages for an electrically variable delay line 43. The composite color television signals from the coarse corrector 30 are also directly applied to the delay line 43 which effects precise and final adjustment of the time base in accordance with the phase comparison. The output signal for the system is then derived from a video amplifier 45 coupled to the delay line 43. This output signal is well within specified standards and suitable for use in a color television transmitter.

To this point, the discussion of FIG. 3 has dealt with the manner it is arranged for NTSC signals. If the color television signal source or tape 13 carries PAL signals, then the switching sequence detector circuitry 1 of the present invention may be switched into the circuit. To accommodate the circuitry 1, the input burst stripper 32 may be keyed by a switch to a 625 line per frame composite PAL television signal. The burst gating pulse for the oscillator 3, the gated burst off the tape for the shaper 2 and the sync pulse for the harmonic eliminator 10 may all originate from the input burst stripper 32. The 7.8 kHz. output from the sequence detector 1 is fed to the reference waveform generator 38 to control a switching mechanism and change the phase of the color burst reference wave form therefrom between the previously noted counter-NTSC phase (225°) and NTSC phase (135°). Simultaneously, the 7.8 kHz. signal may be fed back to the demodulator and process amplifier 29 and the servocontrol 23 to control the capstan drive motor 25 and drum motor 18. Thus, the output signal from the video amplifier 45 is then compatible with PAL standards.

I claim:

1. A system for developing a color burst phase switching sequence signal from a phase alternate line color television signal comprising in combination:

means for extracting the color burst from each line of said television signal, said color bursts reversing phase every other one of said lines;

means for generating a reference signal in predetermined time relation to the horizontal synchronizing pulse of each line of said television signal, said reference signal having a constant phase with respect to said synchronizing pulses;

means for comparing the phases of said color bursts and said reference signal to generate a burst phase representative signal varying in amplitude at half the color burst phase switching rate of said television signal; and means for doubling the frequency of said burst phase representative signal to thereby produce a burst-switching sequence signal at the color burst phase switching rate of said television signal.

2. A system in accordance with claim 1, further defined by the frequency doubling means including differentiator and rectifier means coupled to receive said burst phase representative signal and generate a train of unidirectional pulses having a repetition rate numerically equal to said color burst phase switching rate and conversion means coupled to said differentiator and rectifier means for converting said train of pulses to a continuous waveform at said color burst phase switching rate.

3. A system in accordance with claim 2, in which the conversion means includes a shaping network for generating a continuous square wave at said color burst phase switching rate.

4. A system in accordance with claim 3, further defined by a switching circuit receiving said continuous square wave and synchronizing signal, the conductive and nonconductive states of the switching circuit corresponding to the polarity relationship of the edges of the respective signals.

5. In a signal reproducing system providing a color television signal containing phase-related components of a subcarrier having a selected nominal frequency wherein a color burst signal phase-related component is included whose phase alternates in a known sequence between two selected phases at a rate of one-half the horizontal sync pulse frequency with its phase alternated each reproduced line, the combination comprising, means for extracting the phase alternating color burst signal from the reproduced color television signal, means providing a stable reference signal at the nominal subcarrier frequency, means responsive to the phase alternating color burst signal for providing a signal indicative of the known phase switching sequence and rate of the color burst signal included in each reproduced line of the reproduced color television signal, means coupling the phase switching indicative signal to change the phase of the stable reference signal to that of the selected phases, and means for comparing the phase of the stable reference signal to the actual reproduced phase of the reproduced phase alternating color burst signal to provide an error signal representative of a difference in the actual phases of the compared signals.

6. A system in accordance with claim 5 further comprising means for adjusting the phase of the reproduced color television signal in response to the error signal.